March 5, 1929.  W. H. FIANT  1,704,598
STRAW RACK FOR GRAIN THRASHERS
Filed Oct. 26, 1927   2 Sheets-Sheet 1
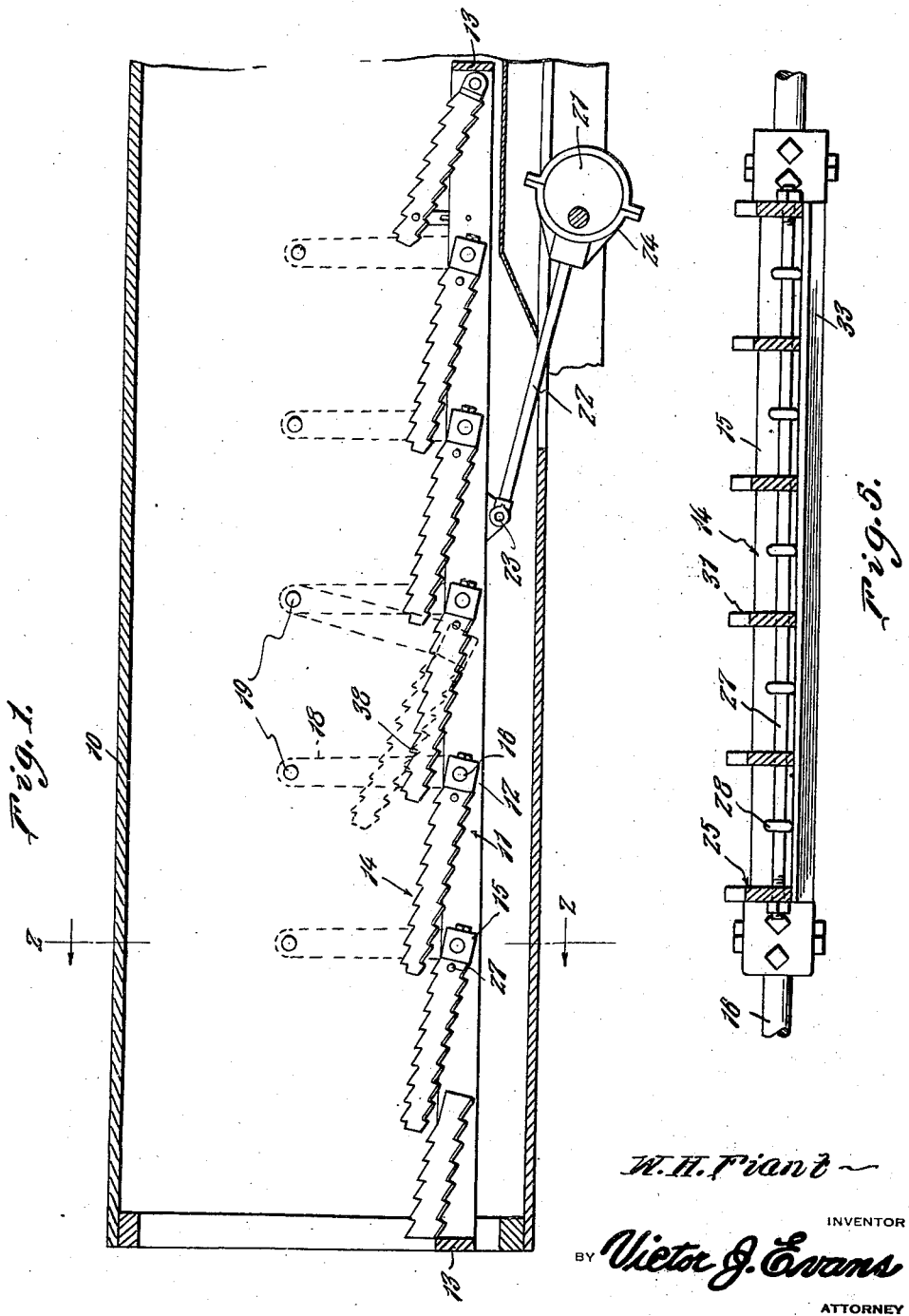

March 5, 1929.　　　W. H. FIANT　　　1,704,598
STRAW RACK FOR GRAIN THRASHERS
Filed Oct. 26, 1927　　　2 Sheets-Sheet 2
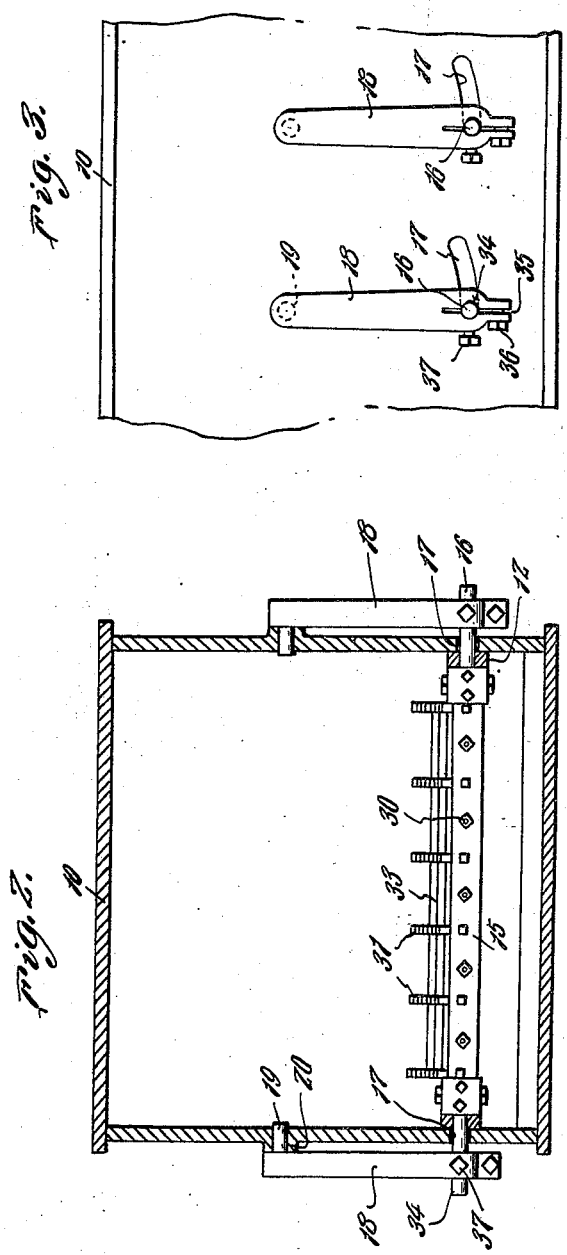
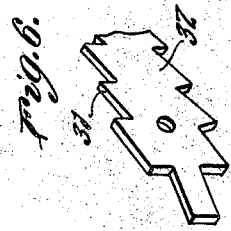
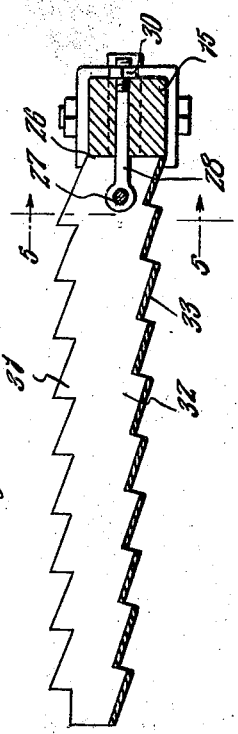
W. H. Fiant
INVENTOR
BY Victor J. Evans
ATTORNEY Patented Mar. 5, 1929.

1,704,598

UNITED STATES PATENT OFFICE.

WILLIAM H. FIANT, OF CARDINGTON, OHIO.

STRAW RACK FOR GRAIN THRASHERS.

Application filed October 26, 1927. Serial No. 228,890.

The present invention relates to straw racks for separating straw from the grain and has for its objects to separate grain from the straw as it passes through the machine in an efficient manner and to prevent the straw from becoming lodged or clogged inside the machine and from becoming packed therein.

A further object is to evenly distribute the straw in a thin layer as it passes over the racks to facilitate the separation of the grain and to discharge the straw from the machine by propelling it toward the rear thereof.

Another object is to accomplish this result by novel and improved means.

Other objects and advantages will appear from the following description and will be set forth in the subjoined claims, and I do not wish to be limited in the scope of my invention except as I shall be limited by said claims.

In the drawings:

Figure 1 illustrates a portion of the casing of the thrashing machine in which the grain is separated from the straw after being thrashed, the view being a longitudinal section taken through the casing and showing my invention.

Figure 2 is a section on the line 2—2 of Figure 1, looking in the direction of the arrows.

Figure 3 is a fragmentary side elevation, showing the arrangement of the rocker arms thereon.

Figure 4 is a detail view of one of the shakers for agitating the straw.

Figure 5 is a section on the line 5—5 of Figure 4, showing the shaker carrying bar in elevation.

Figure 6 is a fragmentary detailed view, showing one of the sides of the shakers.

Referring to the drawings in detail, 10 designates the casing of the separator of a thrashing machine, which as is well known leads from the thrashing cylinder not constituting any part of the present invention and therefore not illustrated. 11 designates a shaker frame comprising side rails 12 and connecting end members 13, 14 designates shakers which are attached, as shown in Figure 4, to the shaker bar 15, the latter being journaled in the side members 12 of the shaker frame and having trunnions 16 projecting through arcuate slots 17 in the walls of the casing and supported by rocker arms 18 pivotally secured to the casing by means of stub shafts 19 rotatably mounted in journals 20 formed in the sides of the casing. The shaker frame is agitated through an eccentric 21 connected with suitable power means and through the pitman rod 22 connecting the eccentric with the shaker frame, the pitman 22 being pivotally connected with the frame at 23 and having a collar 24 surrounding the eccentric. The shakers are comprised of spaced members 25 connected with the shaker bar 15 in any suitable manner, as by being received in sockets 26 formed in the shaker bar and held in place by means of a transverse rod 27 extending through said members and eye bolts 28 on said rods and passing through the shaker bars and tightened thereon by means of nuts 30. The members 25 are provided on their upper and lower edges with oppositely disposed teeth or notches 31 and 32, the lower notches having secured therein transversely extending slats 33 of a thickness considerably less than the greatest depth of the notches, thereby providing between the adjacent slats a passageway permitting the grain to roll by gravity therethrough. The slats 33 form a connection between all of the members 25 of a given shaker, of which there are a plurality as shown in Figure 1.

The rocker arms 18 are provided at their lower ends with bearings 34 and are kerfed at 35, the kerfs extending diametrically through said bearings, whereby the ends of the trunnions 16 on the shaker bars may be rigidly clamped in the bearings 34 by means of nuts 36. Additional means may be provided against relative rotation of the trunnions in the bearings 34 in the form of set screws 37, the inner ends of which are adapted to abut against the surface of the trunnions.

When the thrashing machine is in operation the straw with a certain amount of grain will be fed from the thrashing cylinder onto the shakers and will be given a traveling motion forward by the operation thereof. At the same time the straw will be thoroughly agitated and the grain separated therefrom, dropping upon the slats 33 and passing through the spaces therebetween. As the frame 11 is moved forward the racks will be raised to the dotted line position, as shown for one of the shakers at 38 in Figure 1. A rearward movement of the frame will bring the shakers in the plane of the frame and by the continuous movement of the shaker frame the straw will be caused to progress toward the left end of the casing, where it will be discharged upon the straw stack and will be handled in the usual manner.

Having described my invention, what I claim is:

1. In a thrashing machine, shaker means for separating grain from the straw, comprising a frame reciprocably mounted and means for reciprocating said frame, shakers pivotally mounted in said frame, rocker arms pivotally mounted in the casing and rigidly secured to said shakers, said shakers comprising a plurality of members notched longitudinally upon the upper and lower edges and being spaced transversely of the frame, said spaced members being connected transversely by rearwardly sloping slats secured in the lower notches to lie in stepped relation to each other, said slats being of a thickness less than the greatest depth of the notches in which they are secured to provide spaces therebetween for the passage of grain.

2. In a thrashing machine, shaker means for separating grain from the straw comprising a frame, shaker bars arranged in spaced relation to each other, trunnions secured to the ends of said bars and being mounted in arcuate slots formed in the side walls of the separator casing of the machine, shakers including spaced members having notches formed in their upper and longitudinal edges and having one of their ends received in the sockets of the bars, transverse rods passing through the spaced members of the group carried by each bar, eyed members receiving the rods and secured in said bars to cooperate with the ends received in the sockets for securing the spaced members to said bars, rocker arms having their upper ends journaled to the casing and the lower ends formed with bearings, said lower ends being kerfed, means for the kerfed ends for rigidly securing the trunnions in the bearings, set screws for said trunnions, slats secured in the notches of the lower ends of the groups of spaced members, and means for reciprocating said frame.

In testimony whereof I affix my signature.

WILLIAM H. FIANT.